United States Patent Office 3,446,171
Patented May 27, 1969

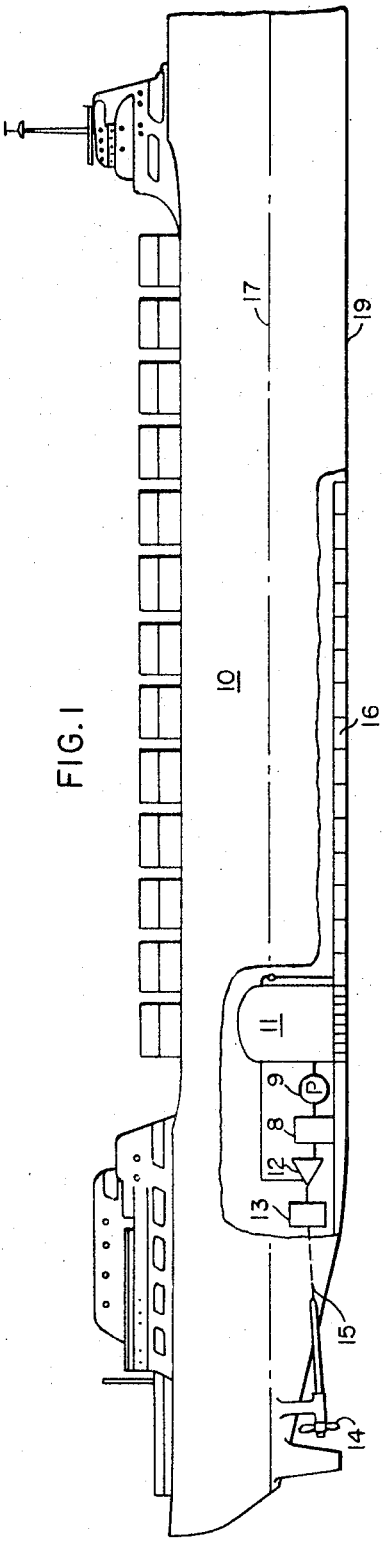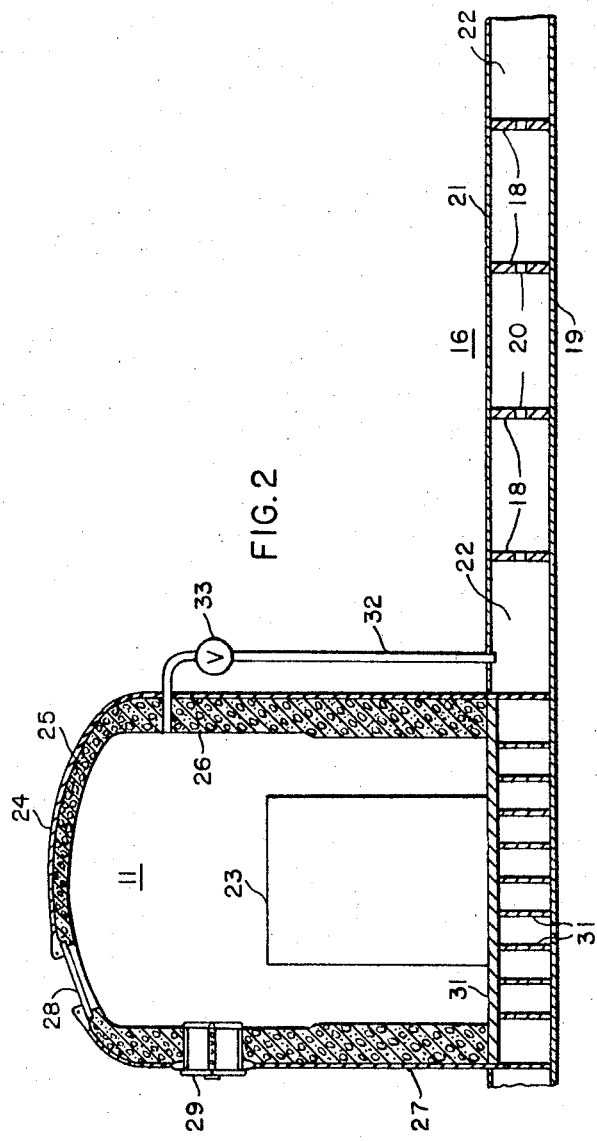
INVENTORS
Robert Panoff and
Theodore Rockwell III

3,446,171
NUCLEAR REACTOR CONTAINMENT SYSTEM
Robert Panoff, Annandale, Va., and Theodore Rockwell III, Bethesda, Md., assignors to Westinghouse Electric Corporation, Pittsburgh, Pa., a corporation of Pennsylvania
Filed Nov. 22, 1966, Ser. No. 596,247
Int. Cl. B63b 35/02
U.S. Cl. 114—.5
6 Claims

ABSTRACT OF THE DISCLOSURE

A containment system for a marine nuclear plant or a land-based-nuclear plant includes a containment vessel and piping means connecting the vessel to the innerbottom of a ship or to a structure having a large unoccupied volume thereby permitting vapor pressure resulting from rupture of the reactor system to be vented into the ship's innerbottom or to the enclosed volume.

---

This invention relates, generally, to nuclear reactor containment systems and, more particularly, to safety arrangements for nuclear reactors on board ships.

The usual practice in a nuclear power plant is to provide for containment of energy which might be released from rupture of the reactor system by providing either a vessel large enough and strong enough to contain the energy, or to provide for the release of the steam, or other vapor, to specially designed water quenching tanks. A normal central station containment system, operating at 60 p.s.i. or less, would be far too large for marine application. A pressure suppression system, relying on bubbling the steam through water, is expensive and complex, and would fail completely if the ship were not upright at the time of the casualty.

An object of this invention is to enable a relatively small container to be utilized, and still achieve suppression of the vapor pressure to insure that fission products are not forced out through any leaks which might somehow develop in the container.

Another object of the invention is to provide for the absorption of energy resulting from a release of high temperature, high pressure water and steam, or other vapor, from a nuclear reactor system.

A further object of the invention is to utilize otherwise unused space in a ship for containing liquid condensed from high pressure vapor released from a nuclear reactor system.

Other objects of the invention will be explained fully hereinafter or will be apparent to those skilled in the art.

In accordance with one embodiment of the invention a pressurized water reactor plant is surrounded by a thick-walled containment vessel capable of withstanding the entire pressure built up by release of the pressurized water coolant. Blow-down pipes are provided which permit the steam pressure thus built up to be vented into the ship's normal innerbottom where it is condensed on the cold supporting structural steel of the ship and the energy ultimately dissipated by conduction through the steel structure and through the hull to the sea. Valves in the blow-down lines are then closed so that if some release of fission products from the fuel subsequently occurs they will be contained within the leak-tight containment vessel and there will be little or no steam pressure tending to disperse the fission products into the environment.

For a better understanding of the nature and objects of the invention, reference may be had to the following detailed description, taken in conjunction with the accompanying drawings, in which:

FIGURE 1 is a view, in elevation, of a portion of a ship having a nuclear reactor plant and containment system constructed in accordance with the invention, a portion of the ship's structure being broken away for clearness; and FIG. 2 is an enlarged view, in section, of the reactor and a portion of the containment system.

Referring to the drawings, and particularly to FIG. 1, the structure shown diagrammatically therein comprises a ship 10, a nuclear reactor plant 11, a steam turbine 12 and reduction gearing 13 which drive a propeller 14 through a shaft 15, a condenser 8 and a pump 9. The ship 10 is of the cargo or merchant type, however, the present invention may be utilized with ships of other types, or land-based plants with a large, unoccupied structure available. The reactor plant 11 shown is of the pressurized water type in which heat from the reactor fuel is transmitted by high pressure, high temperature water to a steam generator where it is placed in heat exchange relationship with a secondary system which forms steam to operate the turbine 12. The containment system herein described may be utilized with reactor plants of other types in which a vapor may be produced upon the occurrence of a rupture in the reactor plant.

The ship 10 has an innerbottom structure 16 which is located below the waterline 17 of the ship. As shown more clearly in FIG. 2, the innerbottom structure 16 normally includes a plurality of spaced structural steel members 18 disposed between the hull 19 of the ship and a metal cover 21, thereby providing enclosed spaces 22 in the innerbottom which are normally not utilized. Openings 20 are provided in the members 18 to interconnect the spaces 22.

The reactor plant 11 includes a reactor core, all of the piping and equipment comprising a primary loop, a steam generator and control apparatus which are not shown in detail, but are represented by a box 23. The reactor plant is surrounded by a thick-walled containment vessel 24 capable of withstanding the entire pressure built up by release of the pressurized water coolant. The vessel 24 may comprise an ellipsoidal head portion 25 and a cylindrical wall portion 27, composed of relatively heavy steel plate capable of withstanding high pressures, surrounding a concrete radiation shield 26. An opening normally closed by a cover plate 28 may be provided in the top of the vessel 24 to permit equipment to be installed inside the vessel. Another opening normally closed by a double door arrangement 29 may be provided in the side of the vessel to permit personnel to enter the vessel. The reactor plant 11 is supported at the bottom of the ship by steel structural members 31.

In order to provide for absorption of energy which might be released from rupture of the reactor system, blow-down pipes 32 connect the interior of the vessel 24 to the innerbottom 16 of the ship. Only one pipe 32 is shown in the drawing, but additional pipes may be provided as required. In this manner, the steam, or other vapor, pressure built up by release of the coolant fluid, is vented into the ship's innerbottom where it is condensed on the cold support structures and the energy ultimately dissipated by conduction through those structures and through the hull to the sea.

Valves 33 are provided in the blow-down piping. These valves can be closed after the vapor pressure is released from the containment vessel 24. Thus, if some release of fission products from the reactor fuel subsequently occurs, it will be contained within the highly leak-tight containment vessel 24 and there would be little or no steam vapor pressure tending to disperse the fission products to the environment. The valves 33 may be of the normally open type, or they may be of a normally closed type which are opened automatically or manually when required.

As explained hereinbefore, the usual practice in a nuclear power plant is to provide for containment of energy which might be released from rupture of the reactor system by providing either a vessel large enough and strong enough to contain the energy, or to provide for the release of the steam or other vapor to specially designed quenching tanks. The present invention provides for venting the vapor to the ship's innerbottom structure having space therein normally not utilized where it is condensed by contact with the cold metal structure without the necessity for providing specially designed and elaborately constructed pressure suppression systems.

Calculations confirm that a typical ship's innerbottom contains sufficient steel structure to absorb the energy from condensing the steam associated with rupture of the associated pressurized water reactor plant. These calculations show that even if one assumes no transfer of heat to the sea, the thermal capacity of the system is sufficient to condense the steam and reduce the pressure as described. Further calculations show that the steam can be vented to the innerbottom without producing unreasonable pressures therein.

As explained hereinbefore, a normal central station containment system, operating at 60 p.s.i. or less, would be too large for marine applications. Likewise, a pressure suppression system, which relies on bubbling the steam through water, is expensive and complex and would not function if the ship were not upright. The present invention enables a small containment vessel to be utilized and still achieve suppression of the vapor pressure to insure that fission products are not forced out through any leaks which might exist in the containment vessel.

Although the application of the invention described in this specification relates to the absorption of energy resulting from a release of high temperature, high pressure water and steam from a nuclear reactor system, the invention can be applied to the release of lesser or greater amounts of energy under similar conditions and in other maritime applications, or shore-based applications where large volumes exist which could be utilized for this purpose.

Since numerous changes may be made in the above-described construction, and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. A nuclear ship reactor containment system comprising a reactor disposed in a ship, a containment vessel surrounding the reactor, said ship having an innerbottom formed in part by the hull thereof and containing an enclosed space located substantially entirely below the waterline of the ship, and piping means connecting the interior of the containment vessel to the enclosed space in the innerbottom.

2. The containment system defined in claim 1 wherein the innerbottom includes a plurality of spaced structural members disposed in the enclosed space.

3. The containment system defined in claim 2 wherein the structural members are composed of metal.

4. The containment system defined in claim 1 wherein the piping means includes valve means located therein.

5. The containment system defined in claim 4 wherein the valve means is normally open.

6. The containment system defined in claim 5 wherein the valve means is operable to the closed position.

References Cited

UNITED STATES PATENTS

| | | | |
|---|---|---|---|
| 1,870,263 | 8/1932 | Neff | 114—16.35 |
| 1,870,263 | 8/1932 | Neff | 114—16.35 |
| 3,253,996 | 5/1966 | Bond et al. | 176—38 X |
| 3,314,858 | 4/1967 | Villadsen | 176—38 X |

REUBEN EPSTEIN, *Primary Examiner.*

U.S. Cl. X.R.
176—37, 38, 87